United States Patent [19]

O'Loughlin et al.

[11] Patent Number: 5,615,912
[45] Date of Patent: Apr. 1, 1997

[54] INFLATOR FOR AIR BAG

[75] Inventors: John P. O'Loughlin, Mesa; James R. Hocking, Chandler, both of Ariz.

[73] Assignee: TRW Vehicle Safety Systems Inc., Lyndhurst, Ohio

[21] Appl. No.: 539,591

[22] Filed: Oct. 5, 1995

[51] Int. Cl.$^6$ .................................. B60R 21/26
[52] U.S. Cl. ............ 280/737; 280/741; 137/68.13; 137/68.25; 222/3; 102/531
[58] Field of Search ................. 280/737, 736, 280/740, 741, 742; 137/68.13, 68.19, 68.21, 68.23, 68.25, 68.28; 102/202.5, 202.14, 530, 531; 222/3

[56] References Cited

U.S. PATENT DOCUMENTS

| | | | |
|---|---|---|---|
| 3,450,414 | 6/1969 | Kobori | 280/736 |
| 3,655,217 | 4/1972 | Johnson | 280/737 |
| 3,674,059 | 7/1972 | Stephenson | 280/737 |
| 3,709,239 | 1/1973 | Morck, Jr. | 137/68.25 |
| 3,721,456 | 3/1973 | McDonald | 280/736 |
| 3,723,205 | 3/1973 | Scheffee | 280/741 |
| 3,817,263 | 6/1974 | Bendler et al. | 280/736 |
| 3,869,143 | 3/1975 | Merrell | 280/737 |
| 3,874,694 | 4/1975 | Stephenson | 280/737 |
| 3,901,530 | 8/1975 | Radke | 280/736 |
| 3,951,428 | 4/1976 | Sugiura et al. | 280/737 |
| 3,960,390 | 6/1976 | Goetz | 280/737 |
| 3,966,226 | 6/1976 | Roth | 280/737 |
| 4,219,040 | 8/1980 | Fallon et al. | 137/68.23 |
| 5,195,777 | 3/1993 | Cuevas | 280/736 |
| 5,199,740 | 4/1993 | Frantom et al. | 280/736 |
| 5,290,060 | 3/1994 | Smith | 280/737 |
| 5,351,989 | 10/1994 | Popek et al. | 280/740 |
| 5,462,307 | 10/1995 | Webber et al. | 280/737 |
| 5,487,559 | 1/1996 | Headley | 280/737 |
| 5,513,572 | 5/1996 | Frantom et al. | 280/737 |

FOREIGN PATENT DOCUMENTS

| | | | |
|---|---|---|---|
| 592254 | 4/1994 | European Pat. Off. | 280/736 |
| 616927 | 9/1994 | European Pat. Off. | 280/736 |
| 639483 | 2/1995 | European Pat. Off. | 280/736 |
| 2237461 | 2/1974 | Germany | 280/741 |
| 4317727 | 12/1993 | Germany | 280/736 |

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An apparatus (20, 320, 420) for inflating an air bag comprises a cylindrical container (40, 340, 440) that includes a tubular housing (42, 342, 442), a pair of axially opposite end walls (44, 46, 444, 446), and a longitudinal central axis (A, B, C). The container (40, 340, 440) defines a fluid storage chamber (48, 348, 448) for storing inflation fluid at a first pressure. One of the end walls (44 or 46, 444 or 446) of the container (40, 340, 440) has an opening (62, 462) through which inflation fluid may flow from the fluid storage chamber (48, 348, 448). A rupturable closure (102, 502) extends across the opening (62, 462) to block the flow of inflation fluid through the opening. The closure (102, 502) ruptures in response to pressure in the fluid storage chamber (48, 348, 448) increasing to a predetermined second pressure to permit the flow of inflation fluid from the fluid storage chamber through the opening (62, 462). An ignitable material (148, 600) is located in the fluid storage chamber (48, 348, 448) adjacent another end wall (46 or 44, 446 or 444) of the container (40, 340, 440). An actuatable igniter (222, 622) has an end (228, 628) located in the fluid storage chamber (40, 340, 440) and is surrounded by the ignitable material (148, 600). The igniter (222, 622), when actuated, ignites the ignitable material (148, 600) to produce combustion products, including heat, which increase the pressure of the inflation fluid in the fluid storage chamber (48, 348, 448) to the predetermined second pressure for rupturing the closure (102, 502).

3 Claims, 4 Drawing Sheets

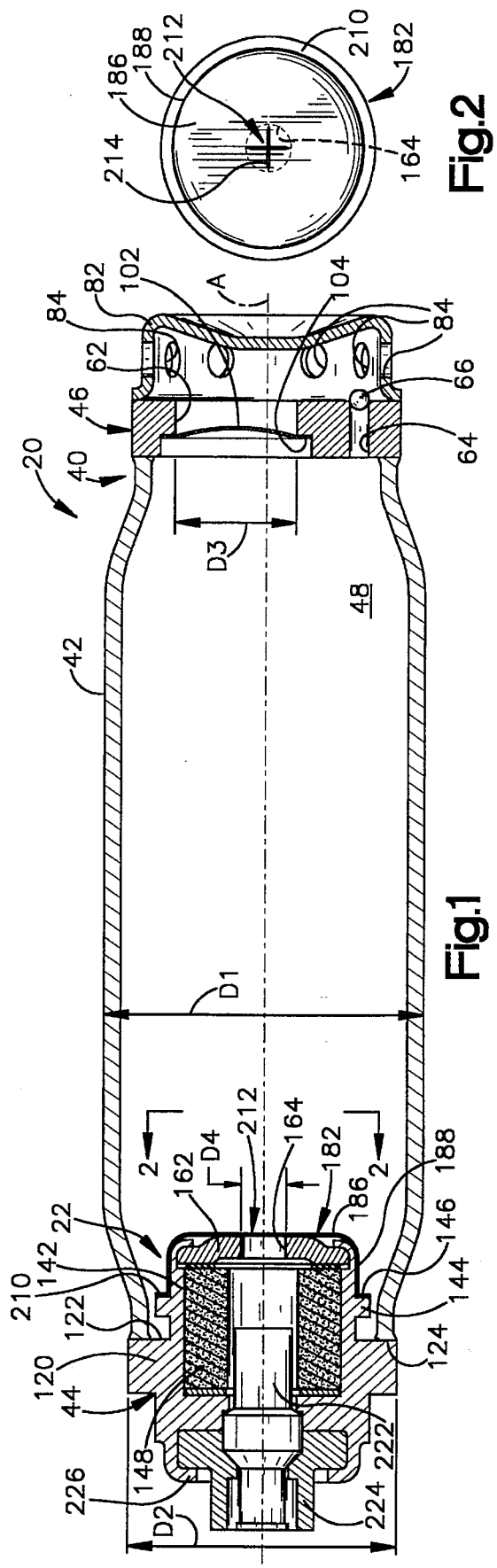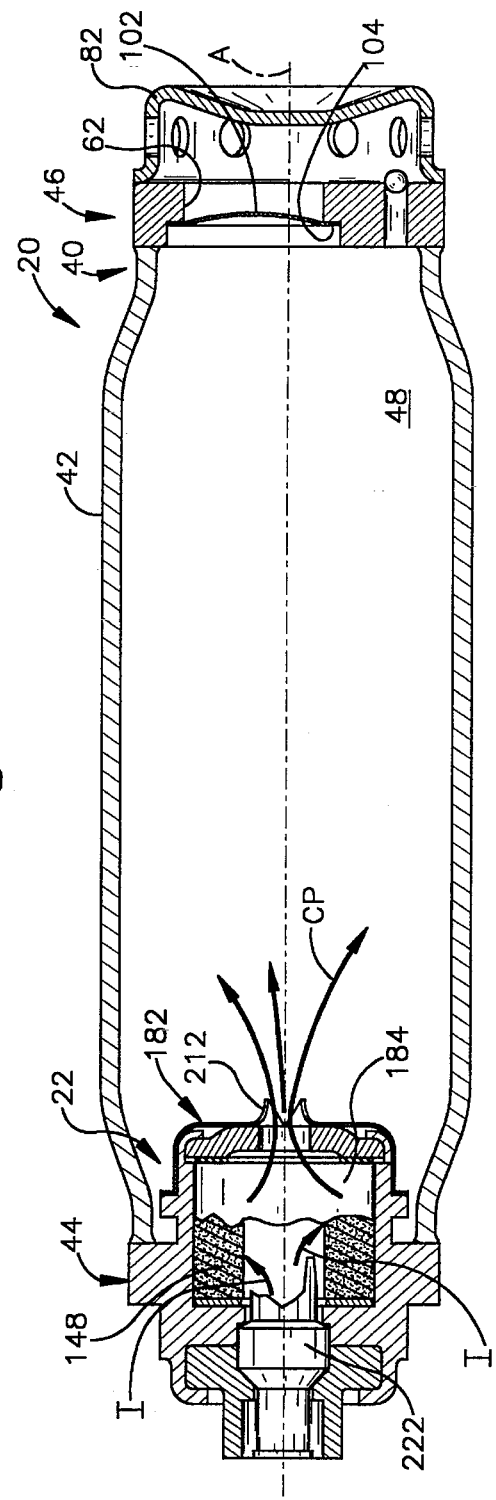

5,615,912

INFLATOR FOR AIR BAG

BACKGROUND OF THE INVENTION

1. Technical Field

The present invention relates to an apparatus for inflating an inflatable vehicle occupant restraint. In particular, the present invention relates to an inflator for inflating an air bag.

2. Description of the Prior Art

Inflators for inflatable occupant restraints, such as air bags, are known. One type of air bag inflator has an inflation gas stored under pressure and an ignitable pyrotechnic charge for heating the inflation gas. Such a known inflator is disclosed in U.S. Pat. No. 5,290,060 and includes a container for storing the inflation gas under pressure. An opening is formed in the container through which the inflation gas can flow into an air bag. A thin metal diaphragm initially blocks the flow of the inflation gas from the container through the opening.

A housing is located in the container and supports a pyrotechnic charge and an initiator. The pyrotechnic charge ignites upon actuation of the initiator to generate combustion products, including heat. The combustion products heat the stored inflation gas and increase the pressure of the inflation gas. The diaphragm bursts in response to a predetermined increase in the pressure of the inflation gas in the container to allow the inflation gas to flow through the opening.

SUMMARY OF THE INVENTION

The present invention is directed to an inflator for a vehicle occupant restraint, such as an air bag. The inflator includes a container for storing inflation fluid under pressure. The container has a pair of axially opposite ends and a longitudinal central axis. The container defines a chamber for storing inflation fluid at a first pressure. One of the ends of the container has an opening which provides fluid communication between the chamber and an air bag. A rupturable closure extends across the opening to block the flow of inflation fluid from the chamber to the air bag. The closure ruptures in response to pressure in the chamber increasing to a predetermined second pressure to permit the flow of inflation fluid from the chamber to the air bag through the opening. An ignitable material is located in the chamber adjacent another end of the container. An actuatable igniter is located in the chamber adjacent the ignitable material. The igniter, upon actuation, ignites the ignitable material to produce combustion products including heat. The combustion products increase the pressure of the inflation fluid in the chamber to the predetermined second pressure to rupture the closure.

A diffuser is fixed to the one end of the container around the opening in the end of the container. The diffuser directs the flow of inflation fluid from the opening towards the air bag.

The container is preferably cylindrical and comprises a tubular housing and a pair of end walls. Each of the end walls is fixed to axially opposite end portions of the tubular housing to define the chamber. The opening in the end of the container is an opening in a first one of the end walls. The opening has a center which is radially offset from a central axis of the tubular housing.

The second end wall of the container has a mounting portion, a tubular portion and a longitudinal central axis. The mounting portion is attached to the tubular housing. A cup is fixed to the tubular portion and has a rupturable portion extending across a first axial end of the tubular portion. The igniter is supported by the mounting portion at an axial end of the tubular portion and has an end located within the tubular portion of the second end wall. The ignitable material is also located within the tubular portion of the second end wall adjacent the end of the igniter. The igniter, when actuated, ignites the ignitable material to rupture the portion of the cup and release combustion products into the container to heat the stored inflation fluid in the container.

A retainer holds the ignitable material in the tubular portion and defines an opening through which the combustion products flow. The retainer is fixed to the second end wall by an axial end of the tubular portion being deformed over a peripheral edge of the retainer. The opening in the retainer is located along the axis of the tubular housing.

The retainer is located within the cup. The cup comprises a tubular side portion which encircles the retainer and which extends axially along the tubular portion of the second end wall. The cup also has a flange portion fixed to a cup mounting of the second end wall.

The ignitable material is tubular in shape and surrounds the end of the igniter. An auto-ignition material is located between the ignitable material and the second end wall.

BRIEF DESCRIPTION OF THE DRAWINGS

Further features and advantages of the present invention will become apparent to those skilled in the art to which the present invention relates from reading the following specification with reference to the accompanying drawings, in which:

FIG. 1 is a schematic view of an inflator according to one embodiment of the present invention;

FIG. 2 is an end view of an inflation fluid heating device in the inflator of FIG. 1, taken along the line 2—2 in FIG. 1;

FIGS. 4 and 5 are views, similar to FIG. 1, of the inflator and the inflation fluid heating device with parts illustrated in different positions;

DESCRIPTION OF PREFERRED EMBODIMENTS

Figure 3:
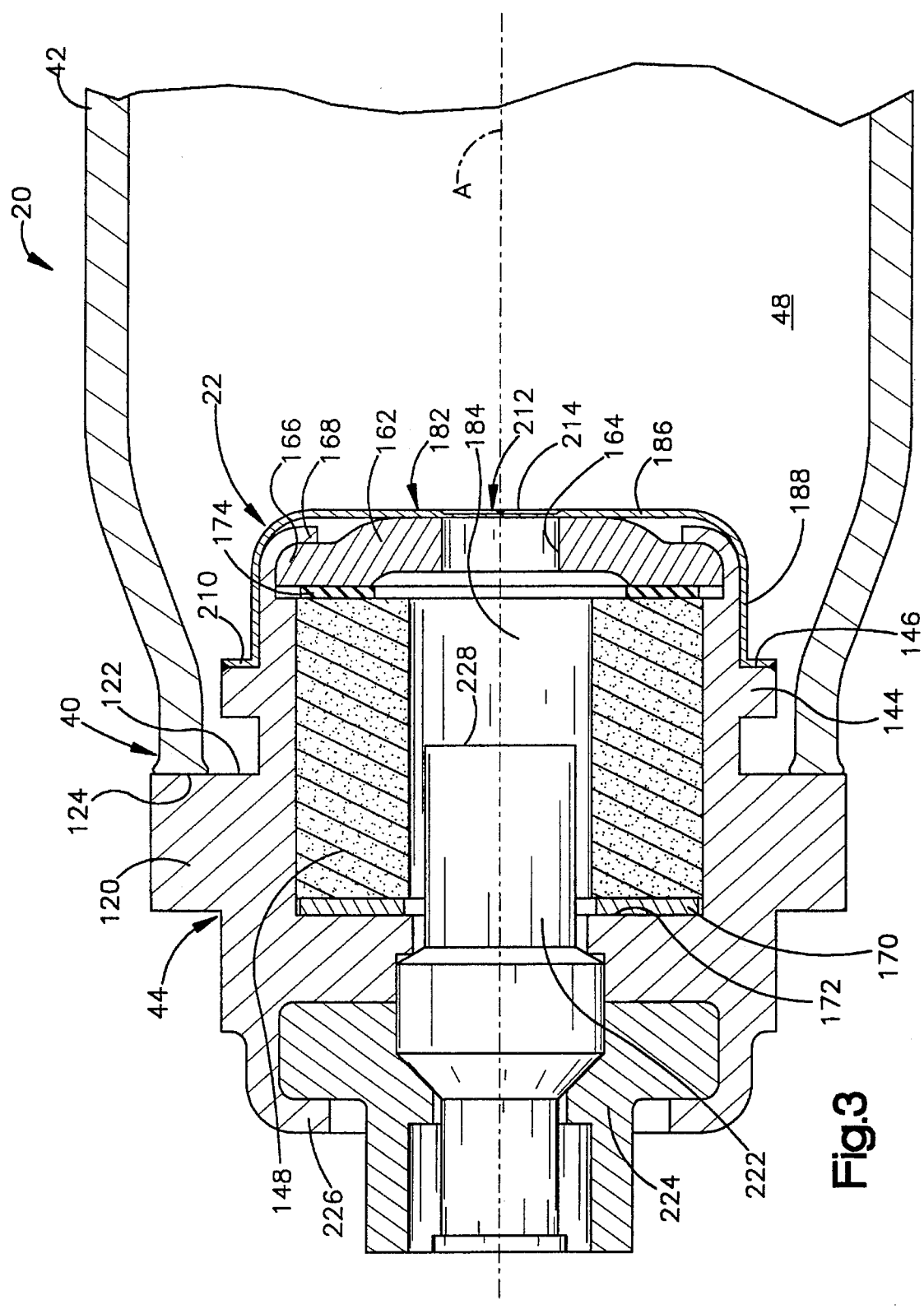
FIG. 3 is an enlarged view of an end portion of the inflator of FIG. 1 and the inflation fluid heating device.

An inflator 20, according to one embodiment of the present invention, is illustrated in FIG. 1 for use in an inflatable vehicle occupant restraint system. The inflator 20 is actuatable to inflate an air bag (not shown). The inflator 20 has a cylindrical shape and can be mounted to a vehicle steering wheel in a horizontal orientation to inflate a driver's side air bag. The inflator 20 includes an inflation fluid heating device 22.

The inflator 20 includes a container 40. The container 40 includes a tubular metal housing 42 (FIGS. 1, 4 and 5) having a longitudinal central axis A. The container 40 also includes a pair of metal end walls 44, 46 which are fixed to axially opposite end portions of the tubular housing 42 in a suitable manner, such as by welding. The largest outer diameter D1 of the tubular housing 42 is greater than the largest outer diameter D2 of the end walls 44, 46. When the tubular housing 42 and the end walls 44, 46 are fixed together, an initially closed chamber 48 is defined.

The chamber 48 stores an inflation fluid. The inflation fluid preferably is a substantially nonignitable inert gas, such as argon, or a combination of non-ignitable inert gases. The inflation fluid is stored in the chamber 48 at a first pressure which is preferably at least 2,000 psi.

The right end wall 46 of the container 40, as viewed in FIG. 1, has a circular opening 62 with a diameter D3. The opening 62 has a center that is radially offset from the axis A. The opening 62 permits flow of the inflation fluid from the chamber 48 to a location outside of the container 40. The right end wall 46 also has a fill port 64 which is sealed by a ball 66.

A cup-shaped diffuser 82 is fixed to the right end wall 46 and surrounds the opening 62. The diffuser 82 includes a plurality of circular openings 84 which direct the flow of inflation fluid in a direction radially outward relative to the axis A. Part of the inflation fluid exiting the diffuser 82 is directed towards a deflector (not shown) which deflects the flow of inflation fluid towards the air bag. Part of the inflation fluid exiting the diffuser 82 is directed towards the air bag. The openings 84 are arranged in a circumferential array about the diffuser 82. It will be apparent that the openings 84 can be of any suitable shape, size and arrangement for directing the inflation fluid in a desired pattern into the air bag.

A closure 102 is fixed to an annular shoulder 104 in the right end wall 46 which is located coaxially about the opening 62. The closure 102 initially blocks the flow of inflation fluid from the chamber 48 through the opening 62 when the closure is unruptured. The closure 102 is coined or weakened to rupture relatively easily and in a predetermined manner. The closure 102 ruptures in response to the pressure of the inflation fluid in the chamber 48 increasing to a predetermined second pressure, which is preferably at least 1.5 times the first pressure. When the closure 102 is ruptured, the inflation fluid flows from the chamber 48, through the opening 62 and to the diffuser 82 for inflating the air bag.

The inflation fluid heating device 22 is located at the axially opposite end of the container 40 in the chamber 48. The inflation fluid heating device 22 (FIG. 3) is actuatable to produce combustion products CP (FIGS. 4 and which heat and increase the pressure of the inflation fluid in the chamber 48. The pressure in the chamber 48 increases to the predetermined second pressure to rupture the closure 102.

The left end wall 44 (FIG. 3) has an annular mounting portion 120 with a radially extending surface 122 facing axially to the right, as viewed in FIGS. 1 and 3. A left end surface 124 of the tubular housing 42 engages the surface 122 of the annular mounting portion 120 and is friction welded to the annular mounting portion. The left end wall 44 also has a tubular portion 142 which extends to the right from the annular mounting portion 120, as viewed in FIGS. 1 and 3, and which is located coaxially along the axis A of the container 40. The tubular portion 142 of the left end wall 44 has an annular cup mounting 144 with a radially extending surface 146 facing in the same direction as the surface 122.

A thin metal cup 182 is received over the end 168 of the tubular portion 142. The cup 182 and the tubular portion 142 of the end wall 44 cooperate to define a closed combustion chamber 184 (FIG. 3). The cup 182 includes a base portion 186 which is adapted to extend normal to the axis A of the container 40. A tubular side portion 188 of the cup 182 extends from the base portion 186 and over the tubular portion 142 of the left end wall 44. The cup 182 has a radial extending end flange 210 which is fixed to the radially extending surface 146 of the cup mounting 144 by a laser weld.

The inflation fluid heating device 22 includes an ignitable material 148, such as potassium perchlorate, located in the tubular portion 142 of the left end wall 44 and within combustion chamber 184. The ignitable material 148 is tubular in shape and ignites to produce the combustion products CP (FIGS. 4 and 5) including heat. The combustion chamber 184 isolates the ignitable material 148 from the inflation fluid in the chamber 48.

The inflation fluid heating device 22 also includes a retainer 162. The retainer 162 holds the ignitable material 148 in position. An opening 164 formed in the retainer 162 is located coaxially along the axis A of the container 40. The base portion 186 of the cup 182 extends across the opening 164 in the retainer 162 to close the opening. The retainer 162 has a radially outer periphery 166 (FIG. 3) and is held in place in the left end wall 44 by an end 168 of the tubular portion 142. The end 168 of the tubular portion 142 is deformed over the outer periphery 166 of the retainer 162 to clamp the retainer to the end wall 44. The opening 164 in the retainer 162 is a centrally located circular opening having a diameter D4 which is smaller than the diameter D3 of the opening 62 in the right end wall 46. Thus the flow area of the opening 62 in the right end wall 46 is greater than the flow area of the opening 164 in the retainer 162.

An auto-ignition material 170 is provided between the ignitable material 148 and a radially extending surface 172 of the left end wall 44. The surface 172 is located at the end of the central passage in the tubular portion 142 opposite the retainer 162. The auto-ignition material 170 directly contacts the left end wall 44 so heat due to elevated temperatures to which the inflator 20 may be exposed is conducted to the auto-ignition material. An elastomeric cushion 174 is provided between the retainer 162 and the ignitable material 148. The cushion 174 compresses when the end 168 of the tubular portion 142 is deformed over the outer periphery 166 of the retainer 162 during assembly.

A central area 212 (FIGS. 1 and 2) of the base portion 186 of the cup 182 is coined to provide a weakened portion 214 in a cruciform shape so as to rupture easily and in a predetermined pattern. The weakened portion 214 of the central area 212 ruptures when pressure in the combustion chamber 184 reaches a third pressure which is greater than the first pressure by a predetermined pressure difference. The cruciform shaped weakened portion 214 of the central area 212 extends radially for a distance approximately equal the diameter D4 of the opening 164. The size of the weakened portion 214 is defined by the distance D4 and is less than half the diameter D3 of the opening 62. In the event that the entire central area 212 separates from the base portion 186 of the cup 182, the separated part of the base portion 186 cannot block flow through the opening 62 in the right end wall 46.

The inflation fluid heating device 22 also includes an actuatable igniter 222 that is supported by the left end wall 44 of the container 40. The igniter 222 extends at least partially into the combustion chamber 184. The igniter 222 is located coaxially along the axis A of the container 40.

The igniter 222 has an axial end surface 228 (FIG. 3) which is surrounded by the tubular ignitable material 148 in the combustion chamber 184. The end surface 228 of the igniter 222 is located substantially at the mid-length of the ignitable material 148, measured in a direction parallel to the axis A. It will be apparent, however, that the end surface 228 of the igniter 222 may be axially located anywhere along the length of the ignitable material 148 or even outside of the axial extent of the ignitable material.

The igniter 222 is held in the left end wall 44 by a mounting member 224. The mounting member 224 is held against the left end wall 44 by deforming a left axial end portion 226 of the end wall over an annular periphery of the mounting member 224.

Figure 5:
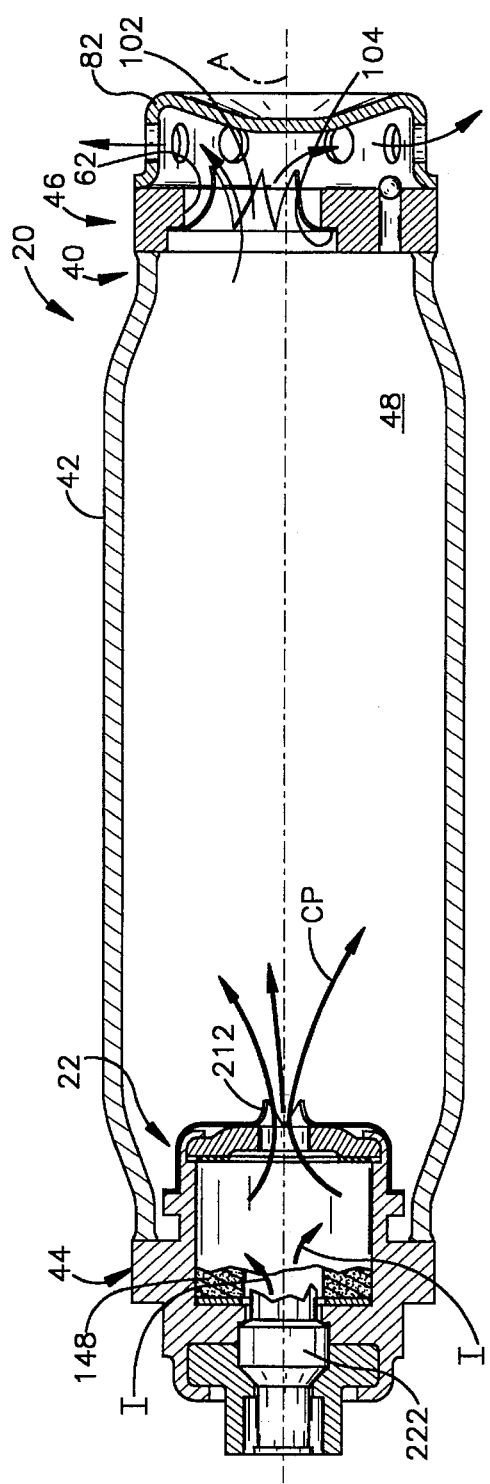

Upon actuation, the igniter 222 produces initiating combustion products I (FIGS. 4 and 5) including heat and hot particles. The ignitable material 148 ignites when contacted by the initiating combustion products I. Upon ignition, the ignitable material 148 produces the combustion products CP in the combustion chamber 184. When the pressure in combustion chamber 184 reaches the third predetermined pressure, the weakened portion 214 of the central area 212 of the cup 182 ruptures, as illustrated in FIG. 4. The combustion products CP are directed through the opening 164 in the retainer 162 and into the inflation fluid in the chamber 48. The combustion products CP heat the inflation fluid in the chamber 48, which causes the pressure in the chamber 48 to increase to the predetermined second pressure and rupture the closure 102, as illustrated in FIG. 5. After the closure 102 ruptures, the inflation fluid is free to flow from the chamber 48 through the opening 62 into the diffuser 82 for inflating the air bag.

An inflator 320 (FIG. 6), according to another embodiment of the present invention, includes a cylindrical container 340. The container 340 includes a tubular metal housing 342 with a longitudinal central axis B. The container 340 also includes the pair of metal end walls 44, 46 which are fixed to axially opposite end portions of the tubular housing 342 in a suitable manner, such as by welding.

The end walls 44, 46 of the container 340 are identical to the end walls illustrated in FIGS. 1, 3, 4 and 5 and described above. The components associated with the end walls 44, 46 are identical to the components illustrated in FIGS. 1–5 and described above, such as the inflation fluid heating device 22, closure 102 and diffuser 82.

The operation of the inflator 320 is identical to the operation of the inflator 20 illustrated in FIGS. 1–5 and described above. The structure of the inflator 320 and the inflator 20 are similar except for the diameters and the lengths of the tubular housing 42 and the tubular housing 342. The largest outer diameter D5 of the tubular housing 342 is substantially equal to the diameter D2 of the end walls 44, 46. The length of the tubular housing 342 is greater than the length of the tubular housing 42.

When the tubular housing 342 and the end walls 44, 46 are fixed together, an initially closed chamber 348 is defined and has a volume about the same as the volume of the chamber 48 of the inflator 20. The chamber 348 stores an inflation fluid under pressure. The inflation fluid is stored in the chamber 348 at a first pressure which is preferably at least 2,000 psi.

Figure 6:
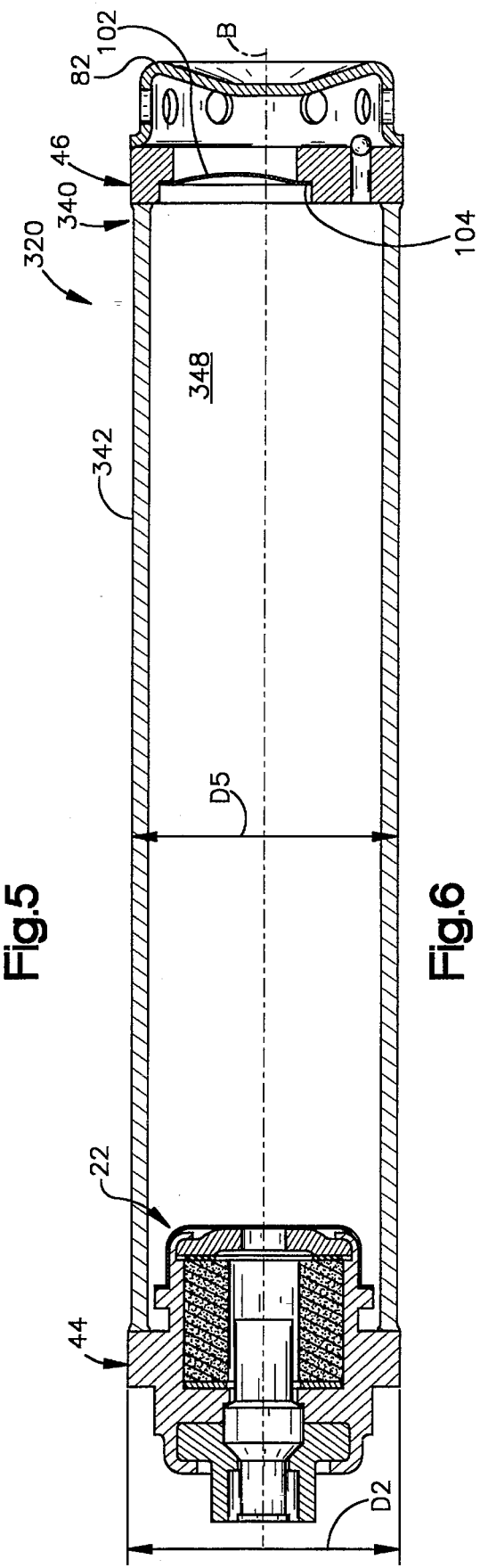
FIG. 6 is a schematic view of another inflator embodying the present invention.

The right end wall 46 of the container 340, as viewed in FIG. 6, has the opening 62. The opening 62 permits flow of the inflation fluid from the chamber 348 to a location outside of the container 340. The cup-shaped diffuser 82 is fixed to the right end wall 46 and surrounds the opening 62.

The closure 102 is fixed to the annular shoulder 104 in the right end wall 46, as viewed in FIG. 6. The closure 102 initially blocks the flow of inflation fluid from the chamber 348 through the opening 62 when the closure is unruptured. The closure 102 ruptures in response to the pressure of the inflation fluid in the chamber 348 increasing to a predetermined second pressure, which is preferably at least 1.5 times the first pressure.

The inflation fluid heating device 22 is located at the axially opposite or left end wall 44 of the container 340 and in the chamber 348, as viewed in FIG. 6. The inflation fluid heating device 22 is actuatable to produce combustion products which heat and pressurize the inflation fluid in the chamber 348. When the pressure in the chamber 348 increases to the predetermined second pressure, the closure 102 ruptures. The inflation fluid is then free to flow from the chamber 348 through the opening 62 for inflating the air bag.

Figure 7:
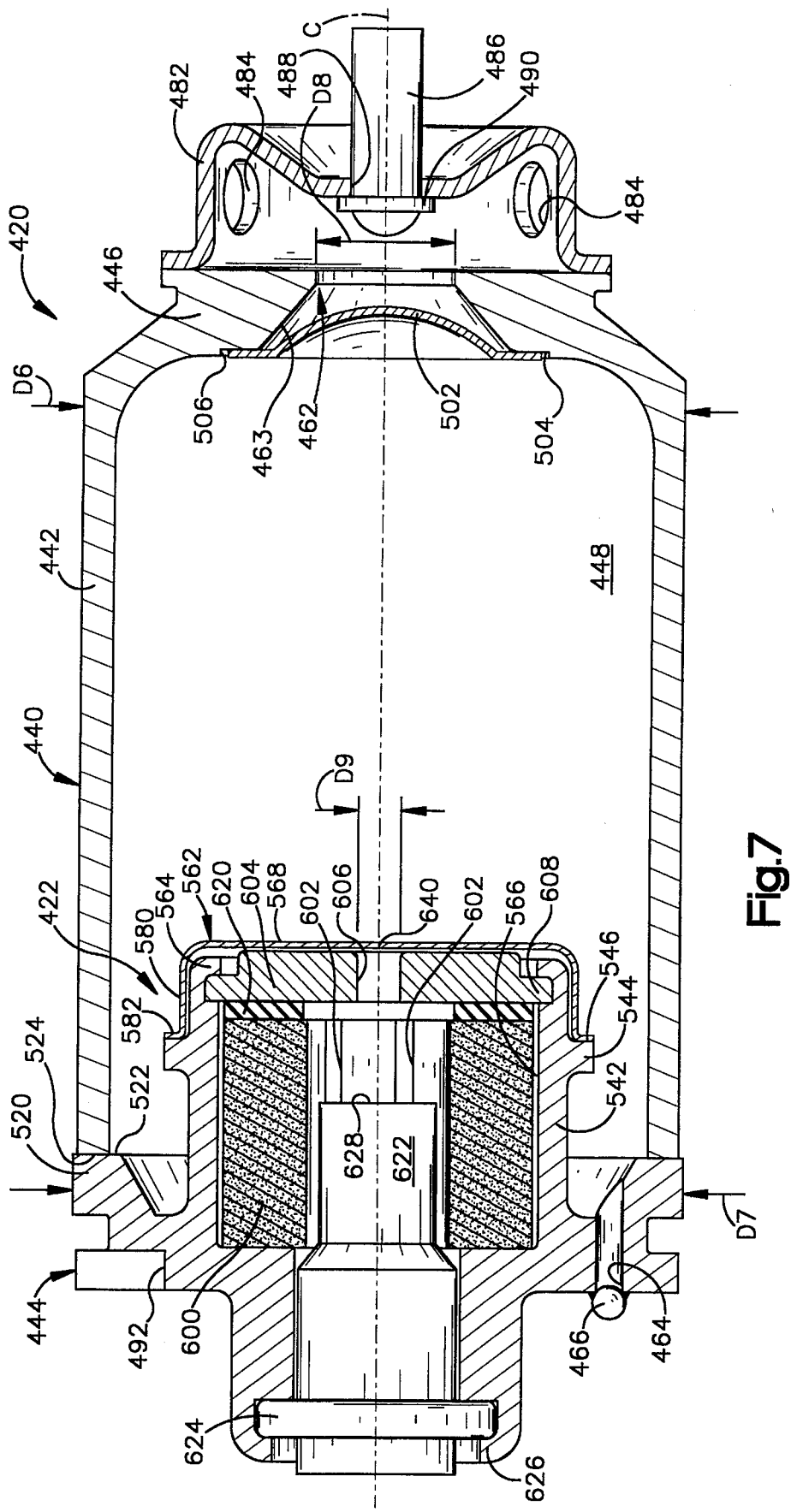
FIG. 7 is a schematic view of yet another inflator embodying the present invention.

An inflator 420, according to yet another embodiment of the present invention, is illustrated in FIG. 7. The inflator 420 includes an inflation fluid heating device 422. The structure of the inflator 420 is similar to the structure of the inflators 20 and 320 illustrated in FIGS. 1–6 and described above. The operation of the inflator 420 is identical to the operation of the inflator 20 illustrated in FIGS. 1–5 and described above and to the operation of the inflator 320 illustrated in FIG. 6 and described above. The structure and operation of the inflation fluid heating device 422 are similar to the structure and operation of the inflation fluid heating device 22 illustrated in FIGS. 1–6 and described above.

The inflator 420 also includes a container 440. The container 440 includes a metal housing 442 having a longitudinal central axis C. The container 440 also includes a pair of metal end walls 444, 446. The left end wall 444 is fixed to a left end of the housing 442, as viewed in FIG. 7. The right end wall 446 is integrally formed as part of the housing 442. The largest outer diameter D6 of the housing 442 is substantially equal to the largest outer diameter D7 of the end walls 444, 446.

When the housing 442 and the left end wall 444 are fixed together, an initially closed chamber 448 is defined. The chamber 448 stores an inflation fluid for inflating an air bag. The inflation fluid preferably is a substantially non-ignitable inert gas, such as argon, or a combination of non-ignitable inert gases. The inflation fluid is stored in the chamber 448 at a first pressure which is preferably at least 2,000 psi.

The right end wall 446 of the container 440, as viewed in FIG. 7, has an opening 462 with a center that is located along the axis C. The opening 462 has a portion 463 which is frustoconical in shape such that the opening 462 has a smallest diameter D8 located away from the chamber 448. The opening 462 permits flow of the inflation fluid from the chamber 448 to a location outside of the container 440. The left end wall 444 has a fill port 464 which is sealed by a ball 466 welded to the left end wall.

A cup-shaped diffuser 482 is fixed to the right end wall 446 and surrounds the opening 462. The diffuser 482 includes a plurality of circular openings 484 which direct the flow of inflation fluid radially outward relative to the axis C. The openings 484 are arranged in a circumferential array about the diffuser 482. It will be apparent that the openings 484 can be of any suitable shape, size and arrangement for directing the inflation fluid in a desired pattern into the air bag. A locator 486 is press fit into a central opening 488 in the diffuser 482. A flange 490 on the locator 486 engages the inside of the diffuser 482 to limit movement of the location relative to the diffuser during the press fit operation. The locator 486 has a D-shaped configuration when viewed along the axis C. The locator 486 and a slot 492 in the left end wall 444 permit orientation of the inflator 420 in mounting structure (not shown) of an air bag module.

A closure 502 is fixed to an annular shoulder 504 in a recess 506 in the right end wall 446. The shoulder 504 and recess 506 are located coaxially about the opening 462. The closure 502 initially blocks the flow of inflation fluid from the chamber 448 through the opening 462 when the closure is unruptured. The closure 502 ruptures in response to the pressure of the inflation fluid in the chamber 448 increasing to a predetermined second pressure, which is preferably at least 1.5 times the first pressure. When the closure 502 is ruptured, the inflation fluid flows from the chamber 448, through the opening 462 and to the diffuser 482 for inflating the air bag. After the closure 502 ruptures, the "petals" of the ruptured closure engage and are supported by the frusto-conical portion 463 of the opening 462.

The inflation fluid heating device 422 is located in the chamber 448 axially opposite the opening 462 of the container 440. The inflation fluid heating device 422 is supported by the left end wall 444 of the container 440. The inflation fluid heating device 422 is actuatable to produce combustion products which heat and increase the pressure of the inflation fluid in the chamber 448. The pressure in the chamber 448 increases to the predetermined second pressure to rupture the closure 502.

The left end wall 444 of the container 440 has an annular mounting portion 520 with a radially extending surface 522 facing axially to the right, as viewed in FIG. 7. A left end surface 524 of the housing 442 engages the radially extending surface 522 of the annular mounting portion 520 of the left end wall 444 and is friction welded or laser beam welded to the annular mounting portion. The left end wall 444 also has a tubular portion 542 which extends to the right from the annular mounting portion 520, as viewed in FIG. 7, and which is located coaxially along the axis C of the container 440. The tubular portion 542 of the left end wall 444 has an annular cup mounting 544 with a radially extending surface 546 facing in the same direction as the radially extending surface 522.

A thin metal cup 562 is received over an end 564 of the tubular portion 542. The cup 562 and the tubular portion 542 of the end wall 444 cooperate to define a closed combustion chamber 566. The cup 562 includes a base portion 568 which is adapted to extend normal to the axis C of the container 440. A tubular side portion 580 of the cup 562 extends from the base portion 568 and over the tubular portion 542 of the left end wall 444. The cup 562 has a radial extending end flange 582 which is fixed to the radially extending surface 546 of the cup mounting 544 by a YAG laser beam weld.

The inflation fluid heating device 422 includes an ignitable material 600, such as potassium perchlorate, located in the tubular portion 542 of the left end wall 444 and within combustion chamber 566. The ignitable material 600 is tubular in shape and ignites to produce combustion products, including heat and pressure. A plurality of grooves 602 extend axially along the inner surface of the ignitable material 600. The grooves 602 increase the surface area of the ignitable material 600 that can start burning. The closed combustion chamber 566 isolates the ignitable material 600 from the inflation fluid in the chamber 448.

The inflation fluid heating device 422 also includes a retainer 604. The retainer 604 holds the ignitable material 600 in position within the combustion chamber 566. An opening 606 formed in the retainer 604 is located coaxially along the axis C of the container 440. The opening 606 in the retainer 604 is a centrally located circular opening having a diameter D9 which is smaller than the smallest diameter D8 of the opening 462 in the right end wall 446. Thus the flow area of the opening 462 in the right end wall 446 is greater than the flow area of the opening 606 in the retainer 604.

The base portion 568 of the cup 562 extends across the opening 606 in the retainer 604 to close the opening. The retainer 604 has a radially outer periphery 608 and is held in place in the left end wall 444 by an end 564 of the tubular portion 542. The end 564 of the tubular portion 542 is deformed over the outer periphery 608 of the retainer 604 to clamp the retainer to the end wall 444.

An elastomeric cushion 620 is provided between the retainer 604 and the ignitable material 600. The cushion 620 compresses when the end 564 of the tubular portion 542 is deformed over the outer periphery 608 of the retainer 604 during assembly.

The inflation fluid heating device 422 also includes an actuatable igniter 622 that is supported by the left end wall 444 of the container 440. The igniter 622 extends at least partially into the combustion chamber 566 and is located coaxially along the axis C of the container 440. The igniter 622 is held in the left end wall 444 by mounting flange 624. The mounting flange 624 is held against the left end wall 444 by deforming an end portion 626 of the left end wall over an annular periphery of the mounting flange 624.

The igniter 622 has an axial end surface 628 which is surrounded by the tubular ignitable material 600 in the combustion chamber 566. The end surface 628 of the igniter 622 is located substantially at the mid-length of the ignitable material 600, measured in a direction parallel to the axis C. It will be apparent, however, that the end surface 628 of the igniter 622 may be axially located anywhere along the length of the ignitable material 600 or even outside of the axial extent of the ignitable material.

Upon actuation, the igniter 622 produces initiating combustion products, including heat and hot particles. The ignitable material 600 ignites when contacted by the initiating combustion products. Upon ignition, the ignitable material 600 produces combustion products in the combustion chamber 566. When the pressure in combustion chamber 566 reaches the third predetermined pressure, a central area 640 of the base portion 568 of the cup 562 ruptures. The combustion products are directed through the opening 606 in the retainer 604 and into the inflation fluid in the chamber 448. The combustion products heat the inflation fluid in the chamber 448, which causes the pressure in the chamber 448 to increase to the predetermined second pressure and rupture the closure 502. After the closure 502 ruptures, the inflation fluid is free to flow from the chamber 448 through the opening 462 into the diffuser 482 to inflate the air bag.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an air bag, said apparatus comprising:

a wall having a mounting portion and a tubular portion with a longitudinal central axis;

a cup fixed to said tubular portion of said wall and having a rupturable base portion extending across a first axial end of said tubular portion of said wall, said wall and said cup cooperating to define a combustion chamber;

an ignitable material supported by said tubular portion of said wall and being located in said combustion chamber;

an actuatable igniter supported by said mounting portion of said wall at a second axial end of said tubular portion, said igniter having an end located within the combustion chamber and, when actuated, igniting said ignitable material to rupture said base portion of said cup to release combustion products from said combustion chamber; and a retainer for holding said ignitable material in said tubular portion of said wall and having an opening through which said combustion products flow;

said retainer being fixed to said wall by an axial end portion of said tubular portion which is deformed over a peripheral edge of said retainer, said opening in said retainer being located along said axis of said tubular portion of said wall.

2. An apparatus for inflating an air bag, said apparatus comprising:

a wall having a mounting portion and a tubular portion with a longitudinal central axis;

a cup fixed to said tubular portion of said wall and having a rupturable base portion extending across a first axial end of said tubular portion of said wall, said wall and said cup cooperating to define a combustion chamber;

an ignitable material supported by said tubular portion of said wall and being located in said combustion chamber; and an actuatable igniter supported by said mounting portion of said wall at a second axial end of said tubular portion, said igniter having an end located within the combustion chamber and, when actuated, igniting said ignitable material to rupture said base portion of said cup to release combustion products from said combustion chamber;

said cup including a tubular side portion attached to said base portion for extending axially along said tubular portion of said wall, said cup further including a flange portion attached to said tubular side portion and being fixed to a cup mounting portion of said wall.

3. An apparatus for inflating an air bag, said apparatus comprising:

a container defining a storage chamber containing inflation fluid under pressure, said container having an end wall with surfaces defining an inflation fluid outlet opening centered on an axis; and a rupturable closure blocking said inflation fluid from flowing outward through said outlet opening, said closure having a flat annular peripheral portion perpendicular to said axis, said closure further having a dome-shaped central portion projecting axially outward from said peripheral portion;

said surfaces of said end wall including a planar surface, a frustoconical surface, and a cylindrical surface;

said planar surface of said end wall adjoining said closure in abutment with said peripheral portion of said closure;

said frustoconical surface of said end wall projecting radially inward and axially outward from said planar surface to said cylindrical surface and extending axially outward beyond said dome-shaped central portion of said closure;

said cylindrical surface of said end wall defining a diametrically smallest portion of said outlet opening and being spaced axially outward from said dome-shaped central portion of said closure.

* * * * *